June 10, 1930.  N. McCLOSKEY  1,762,401
HEDGE TRIMMER
Filed April 10, 1928    2 Sheets-Sheet 1

WITNESSES:

INVENTOR:
Nellie Mc Closkey,
BY
ATTORNEY.

June 10, 1930.  N. McCLOSKEY  1,762,401
HEDGE TRIMMER
Filed April 10, 1928   2 Sheets-Sheet 2
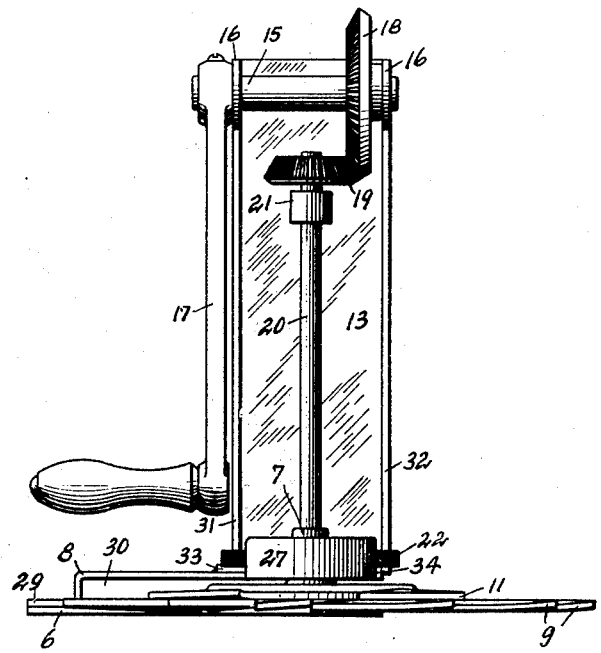
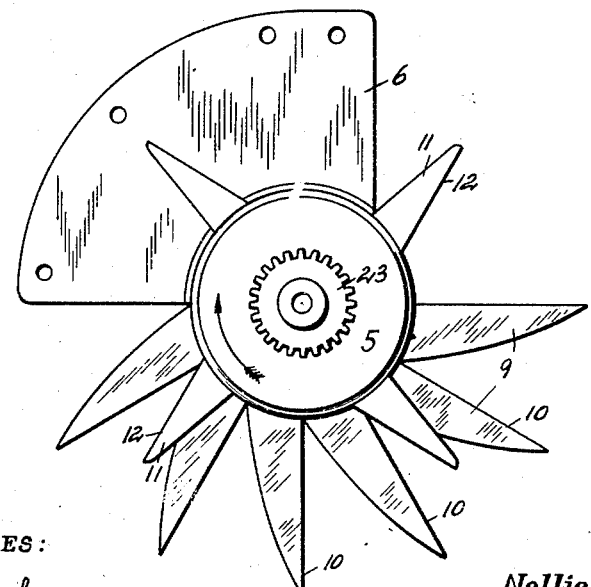
WITNESSES:
INVENTOR
Nellie Mc Closkey,
BY
ATTORNEY.

Patented June 10, 1930

1,762,401

UNITED STATES PATENT OFFICE

NELLIE McCLOSKEY, OF PHILADELPHIA, PENNSYLVANIA

HEDGE TRIMMER

Application filed April 10, 1928. Serial No. 268,821.

My invention relates to shearing tools and more particularly to a tool for trimming hedges.

When using the shears usually employed, considerable skill is required to trim a hedge evenly and artistically and the operation is long and arduous.

The object of my invention is to provide a hedge trimmer by means of which a person possessing but little skill can trim a hedge evenly and quickly.

Figure 1:
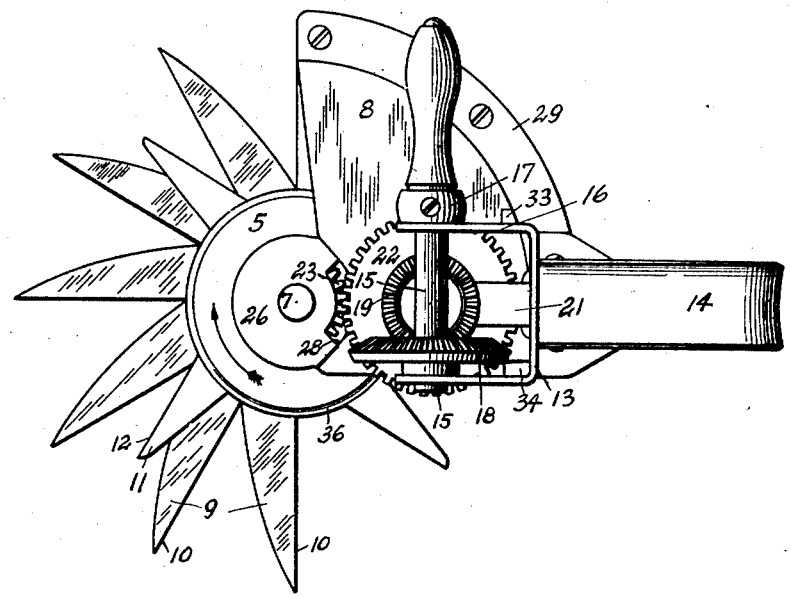
Figure 2:
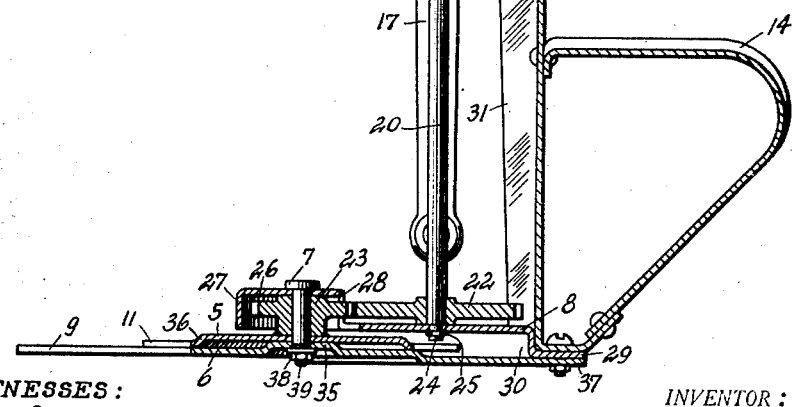

The invention resides in the features of construction and arrangement of elements hereinafter described and claimed, and illustrated by the embodiment shown in the accompanying drawings, in which Figure 1 is a top plan view of a hedge trimmer made in accordance with my invention, Figure 2 is a central vertical section therethrough, Figure 3 a front elevation thereof, and Figure 4 a top plan view of the base and rotatable cutting element.

The tool has a cutter 5 resting upon a bottom plate or base 6 and rotatable upon a pin 7 extending through the base and held vertically by a guard 8 fixed to the base. The base has radially extending shear blades 9 having cutting edges 10, and the cutter has radially extending shear blades 11 having cutting edges 12 coacting with cutting edges 10. In use, any shoots of the hedge inserted between shear blades 9 will be severed by cutting edges 10 and 12 when the cutter is rotated, in the direction of the arrows on Figures 1 and 4, to bring blades 9 and 11 into cutting engagement.

An upright 13 is secured to the guard and the base and has a handle 14 on its rear side. A driving shaft 15, rotatably mounted in a U-shaped bearing 16, at the top of the upright, carries a crank 17 and a bevel gear 18 which meshes with a bevel pinion 19 fixed on the upper end of a vertical shaft 20 rotatable in guard 8 and in a bearing 21 on the upright. A spur gear 22 on the lower end of shaft 20 meshes with a pinion 23 secured to the cutter and rotatable upon pin 7 beneath guard 8.

Shaft 20 is held against downward movement by the hub of pinion 19 resting upon bearing 21 and by the hub of gear 22 resting upon guard 8. It may be held against upward movement by forming a reduced part 24 on its lower end which extends through the guard and has a snap ring 25 fitting in a groove in the reduced part and abutting the underside of the guard.

As shown best in Figure 2, guard 8 has an arcuate part 26 disposed above pinion 23 and provided with a downwardly extending flange 27 for preventing material from coming in contact with the teeth of the pinion. An opening 28 is formed in the rear side of flange 27 so that gear 22 may mesh with pinion 23. The rear edge of the guard is depressed to form a flange 29 and to provide a compartment 30 between the guard and the base in which the cutter may rotate. When flange 29 is secured to the edge of the base, guard 8 forms a rigid support for shaft 20 and pin 7 and stiffens the entire structure. In order to stiffen upright 13, ribs 31 and 32 are formed on its sides and have their lower ends 33 and 34 bent at right angles and secured to the guard.

The base and the cutter may be made flat but, in order to reduce friction, a small elevation 35 is formed near the center of the base and supports the cutter which is preferably dished, as shown in Figure 2. The shear blades are canted, as shown in Figure 3, and guided into engagement with one another by a flange 36 formed on the cutter and riding upon the base adjacent the inner ends of blades 9.

The rear part 37 of the base is offset slightly, as shown in Figure 2, so that shear blades 11 may turn freely after leaving the shear blade 9 at the right hand side of the tool. Pin 7 preferably has a running fit in pinion 23 and extends through the base in which it is held by a nut 38 threaded upon its reduced end 39 and abutting a washer placed between itself and the base so that the pressure between the cutter and base may be regulated to compensate for wear.

In using the trimmer, handle 14 is grasped in the left hand, crank 17 turned with the right hand and the trimmer moved forwardly, or forwardly and laterally, over the hedge while holding base 6 in the same plane, if a flat surface is to be produced, or moving base 6 on an arc, if a curved surface is to be produced. Shear blades 9 are longer than shear blades 11 and act as fingers for separating the parts of the hedge and guiding the parts thus separated into the path of the revolving blades 11. The result is a more evenly trimmed hedge than is ordinarily possible, even when an unskilled person operates the trimmer, and the hedge is trimmed in less time than is usually required.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claim.

I claim:—

A trimmer of the class described, including a flat base having a raised portion and radially extending shearing members, a cutter rotatably connected to said raised portion and resting thereupon, said cutter having a flange extending downwardly into substantial contact with said base and in spaced relation to said raised portion, and shearing members extending radially from said flange in coacting relation to the first named shearing members.

In testimony whereof I have signed my name to this specification.

NELLIE McCLOSKEY.